United States Patent [19]

Russo et al.

[11] Patent Number: 4,731,256

[45] Date of Patent: Mar. 15, 1988

[54] LIQUID COATING COMPOSITION FOR PRODUCING HIGH QUALITY, HIGH PERFORMANCE FLUORINE-DOPED TIN OXIDE COATINGS

[75] Inventors: David A. Russo, Edison, N.J.; Georg H. Lindner, Vlissingen; Marinus K. Schilders, Kapelle, both of Netherlands

[73] Assignee: M&T Chemicals Inc., Woodbridge, N.J.

[21] Appl. No.: 887,309

[22] Filed: Jul. 18, 1986

Related U.S. Application Data

[63] Continuation-in-part of Ser. No. 784,279, Oct. 4, 1985, Pat. No. 4,601,917, which is a continuation-in-part of Ser. No. 705,595, Feb. 26, 1985, which is a continuation-in-part of Ser. No. 687,065, Dec. 28, 1984, abandoned, which is a continuation-in-part of Ser. No. 598,623, Apr. 10, 1984, abandoned.

[51] Int. Cl.⁴ .......................... B05D 7/22; B05D 5/12; C02C 17/245

[52] U.S. Cl. .................................. 427/109; 427/110; 427/160; 427/166; 427/168; 427/226; 427/314; 106/287.19

[58] Field of Search .................. 106/287.19; 427/109, 427/160, 166, 110, 168, 314, 226

[56] References Cited

U.S. PATENT DOCUMENTS 4,265,974 5/1981 Gordon .............................. 427/109
4,293,594 10/1981 Yoldas et al. ...................... 427/109

Primary Examiner—Janyce A. Bell
Attorney, Agent, or Firm—S. H. Parker; R. E. Bright

[57] ABSTRACT

An improved liquid coating composition for producing high quality, high performance fluorine-doped tin oxide coatings by chemical vapor deposition includes the reaction product of a reactive fluorine dopant compound and an organotin compound, preferably 1-30 wt. % of the fluorine dopant and 70-99 wt. % of the organotin compound. The preferred liquid coating composition includes the reaction product of trifluoroacetic acid and monobutyltin trichloride.

22 Claims, 1 Drawing Figure

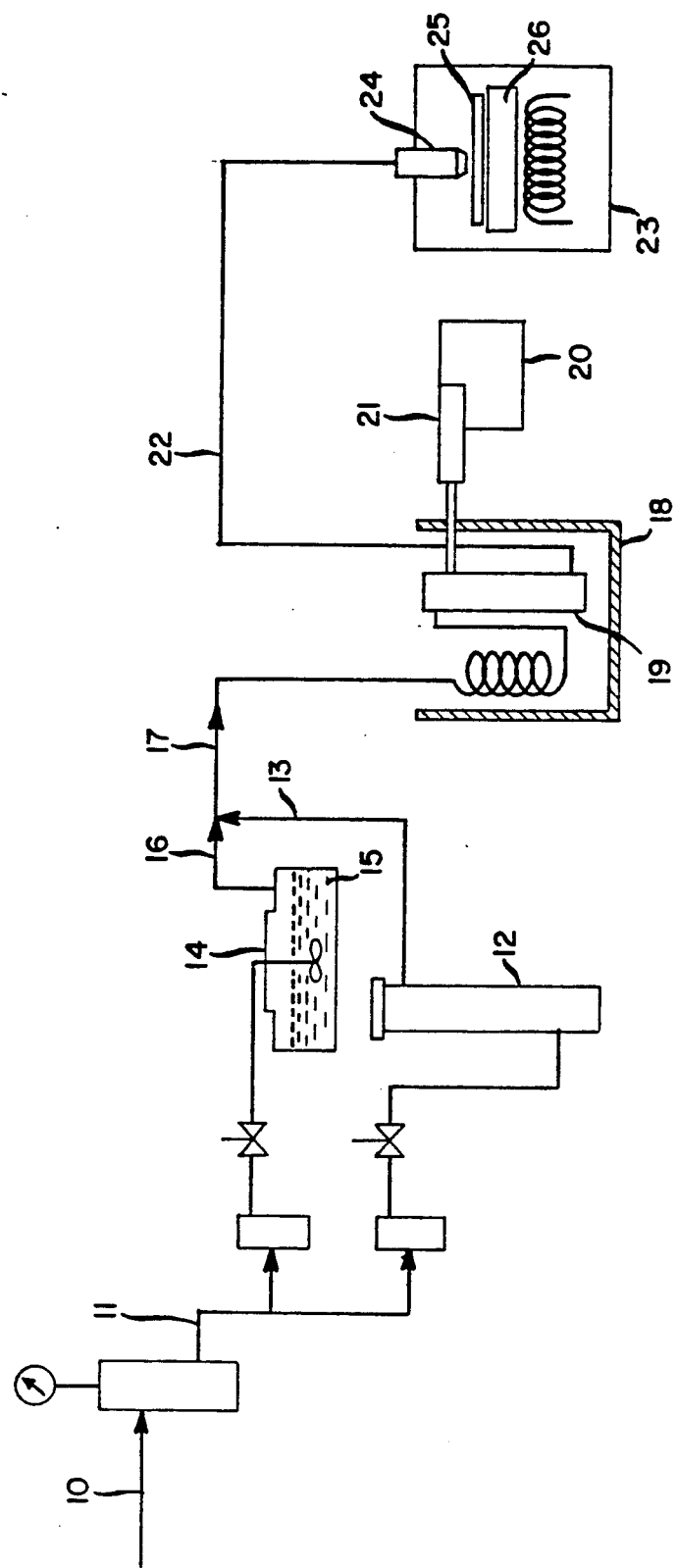

LIQUID COATING COMPOSITION FOR PRODUCING HIGH QUALITY, HIGH PERFORMANCE FLUORINE-DOPED TIN OXIDE COATINGS

CROSS-REFERENCE TO RELATED APPLICATIONS

This application is a continuation-in-part of U.S. Ser. No. 784,279, filed 10-4-85 now U.S. Pat. No. 4,601,917 which is a continuation-in-part of co-pending U.S. Ser. No. 705,595, filed Feb. 26, 1985 which itself was a continuation-in-part of co-pending U.S. Ser. No. 687,065, filed Dec. 28, 1984, now abandoned, which itself was a continuation-in-part of co-pending U.S. Ser. No. 598,623, filed Apr. 10, 1984, now abandoned, by Georg H. Lindner and David A. Russo.

BACKGROUND OF THE INVENTION

1. Field of the Invention

This invention relates to fluorine-doped tin oxide coatings, and more particularly, to an improved liquid coating composition for producing high quality fluorine-doped tin oxide coatings having a low sheet resistance and high visible light transmission.

2. Description of the Prior Art

Fluorine-doped tin oxide coatings are known to impart useful properties to many different substrate surfaces, including glass, ceramics, metals and elemental filaments. Such coated substrates find use as heat reflective elements, in energy efficient windows and in optoelectronic and semiconductor devices.

Several methods have been described in the literature to make such tin oxide coatings, including solution spray, chemical vapor deposition, powder deposition and ion sputtering. See, for example, U.S. Pat. Nos. 3,677,814; 3,759,743; 3,949,146; 4,130,673; 4,265,974; 4,293,594; 4,325,988; 4,389,238; 4,500,567; German Pat. No. 3,010,077 (1980); Japan Kokai No. 75 61 415 (1975); Japan Kokai No. 75 61 416 (1975); Japan Kokai No. 75 61695 (1975); and U.S.S.R. No. 142,000 (Chem. Abs. 56, 13676f).

These methods all suffer from one or more disadvantages in that the process conditions, or compositions used, or the properties of the resulting tin oxide coatings, are not entirely satisfactory for certain commercial applications. Where the product is an energy efficient window, for example, success has been limited by the relatively high sheet resistance and low visible transparency of the coatings, or by the cost of the process.

The solution spray method is described, for example, in Japan Kokai No. 75 61,415. In this method a solution of dibutyltin diacetate and ethyl trifluoroacetate in isopropyl alcohol as a solvent is sprayed onto a glass plate to provide fluorine-doped tin oxide coatings. However, a large amount of solvent is present in the solution, generally about 50 wt %, which must be removed during the process. Furthermore, the electrical resistivity of the coatings obtained have an unacceptable value of 230 ohms/square.

A chemical vapor deposition method is disclosed by Kato et al. in U.S. Pat. No. 4,500,567. The process uses a gaseous mixture of butyltin trichloride and dichlorodifluoromethane which is formed from separate gaseous streams of each reactant. The gaseous mixture then is deposited onto a glass surface. However, in this method, it is inconvenient to control the flow rates of the gaseous streams, and the electrical properties of the coating are not adequate.

Gordon, in U.S. Pat. No. 4,265,974, teaches that mixtures of tetramethyltin and α-fluoroalkyl halides can be decomposed to provide fluorine-doped tin oxide films with good optical and electrical properties. However, the reaction mixture is explosive in air above 1.9 wt % tetramethyltin, which severely limits the rate of deposition of the coating on sheet glass. In addition, tetramethyltin and its decomposition by-products are very toxic.

Yoldas, in U.S. Pat. No. 4,293,594, discloses a vapor deposition method of forming a highly conductive transparent fluorine-doped tin oxide coating for fluorescent lamps. The patentee uses a gaseous mixture of dimethyltin dichloride and dimethyltin difluoride in an oxygen-containing carrier gas to produce the coating. However, these tin compounds are solids which must be vaporized at high temperatures to provide a gaseous mixture.

As will be apparent from the above-described review of the prior art, there is a need for an improved process of making high quality, high performance fluorine-doped tin oxide coatings.

Accordingly, it is an object of this invention to provide an improved method for forming high quality, high performance fluorine-doped tin oxide coatings.

A particular object herein is to provide an improved liquid coating composition for the production of such fluorine-doped tin oxide coatings under advantageous process conditions.

Still another object herein is to provide a liquid coating composition which includes the reaction product of a fluorine dopant and organotin compounds in predetermined concentration ranges, from which fluorine-doped tin oxide coatings which have a low sheet resistance and high visible transparency may be made in a relatively short deposition time.

SUMMARY OF THE INVENTION

In accordance with the invention, there is provided herein an improved liquid coating composition for making fluorine-doped tin oxide coatings on substrates such as glass which have a low sheet resistance and high light transmission. The liquid coating composition includes the reaction product of:

a reactive organic fluorine dopant compound where at least one fluorine atom is located alpha or beta to a functional group wherein carbon is bonded to oxygen selected from carboxylic acid, anhydride, ester, alcohol, or acid halide; and an organotin compound which is an alkyltin trichloride, a dialkyltin dichloride, an alkyldichlorotin acetate, an ester tin trichloride; or tin tetrachloride.

The preferred liquid coating composition of the invention includes the reaction product of 1–30 wt. % of the fluorine dopant and 70–99 wt. % of the organotin compound.

Representative reactive organic fluorine dopants include trifluoroacetic acid, trifluoroacetic anhydride, ethyl trifluoroacetoacetate, trifluoroethanol, ethyl trifluoroacetate, pentafluoropropionic acid, and heptafluorobutyryl chloride.

Typical organotin compounds include monobutyltin trichloride, dibutyltin dichloride, butyldichlorotin acetate, carbethoxyethyltin trichloride. Tin tetrachloride also may be used as the tin compound.

In preferred forms of the invention the reaction product is formed from trifluoroacetic acid, trifluoroacetic anhydride, ethyl trifluoroacetoacetate or trifluoroethanol and monobutyltin trichloride.

The method used herein to produce high quality, high performance fluorine-doped tin oxide coatings from the liquid coating composition of the invention is chemical vapor deposition. In this method the liquid composition is vaporized and contacted in an oxygen-containing atmosphere with a substrate maintained at a temperature above the decomposition temperature of said vapor. Preferably vaporization of the liquid coating composition is carried out by injecting the liquid into a carrier gas maintained at a temperature sufficient to vaporize said liquid.

BRIEF DESCRIPTION OF THE DRAWINGS

In order to better understand the invention reference will be made to the accompanying drawing in which:

The FIGURE is a schematic diagram of an apparatus for carrying out a coating process using the liquid coating composition of the invention.

DETAILED DESCRIPTION OF THE INVENTION

Referring now to the FIGURE, there is shown a diagrammatic representation of an apparatus suitable for carrying out the process of the present invention. Accordingly, a carrier gas 10 which includes oxygen, with air being preferred, is metered through a feed line 11 at a predetermined flow rate suitably about 1–30 l/min., and preferably about 3–15 l/min., through an air dryer tower 12 to provide a stream 13 of dry air. A separate air stream may be directed through a humidifier 14 containing a suitable quantity of water 15 to provide a wet air stream 16 at a desired relative humidity. Thereby an air stream 17, either dry or wet, may be passed through an evaporator 18 contained in oil bath 19 for holding the liquid coating composition of the invention. The liquid composition is supplied to evaporator 18 by syringe pump 20 and syringe 21. The air stream is heated from the oil bath to a desired vaporization temperature before it enters evaporator 18.

The vaporized liquid coating composition in the air stream 22 travels to a deposition chamber 23 having a coating nozzle 24 in which a substrate 25 is mounted on a heated plate 26. After deposition of the desired coating the gaseous by-products of the deposition are exhausted.

The liquid coating composition of the invention includes the reaction product of:

(a) 1–30 wt. % of a reactive organic fluorine dopant compound where at least one fluorine atom is located alpha or beta to a functional group wherein carbon is bonded to oxygen, selected from carboxylic acid, anhydride, ester, alcohol, or acid halide; and (b) 70–99 wt. % of an organotin compound which is an alkyltin trichloride, a dialkyltin dichloride, an alkyldichlorotin acetate, or an ester tin trichloride, or tin tetrachloride.

Accordingly, suitable functional groups and reactive organic fluorine dopants include the following:

Carboxylic acids trifluoroacetic acid
chlorodifluoroacetic acid
difluoroacetic acid
heptofluorobutynic acid
pentafluoropropionic acid
3-trifluoromethylcrotonic acid
nonafluoropentanoic acid

Anhydrides trifluoroacetic anhydride
heptafluorobutyric anhydride
pentafluoropropionic anhydride
chlorodifluoroacetic anhydride
perfluoroglutaric anhydride
perfluorosuccinic anhydride

Esters ethyl trifluoroacetate
butyl trifluoroacetate
ethyl bromodifluoroacetate
ethyl chlorofluoroacetate
methyl pentafluoropropionate
methyl heptofluorobutyrate
methyl trifluoroacetate
methyl perfluorobuten-3-oate
2,2,2-trifluoroethyltrifluoroacetate
1,1,1-trifluoroisopropylacetate

Alcohols 2,2,2-trifluoroethanol
1H, 1H-heptafluorobutanol-1
3,3,4,4,5,5,5-heptafluoropentanol-2
heptafluoroisopropanol
hexafluoro-2-methylisopropanol
1H, 1H,5H-octafluoro-1-pentanol
perfluoro-t-butanol
2-trifluoromethylpropanol-2
1,1,1-trifluoropropanol-2
perfluoroethanol

Acid halides heptafluorobutyryl chloride
perflouroglutaryl fluoride
perfluoroctanoyl chloride
perfluorosuccinyl chloride The term "alkyl" used herein includes a straight chain and branched alkyl group which has one to six carbon atoms.

The term "organotin" compound used herein includes tin tetrachloride.

Accordingly, suitable organotin compounds include monobutyltin trichloride, isobutyltin trichloride, methyltin trichloride, dibutyltin dichloride, diisobutyltin dichloride, di-t-butyltin dichloride, butyldichlorotin acetate, and carbethoxyethyltin trichloride: and tin tetrachloride.

The essential characteristic of the coating composition of the invention is that it is liquid at room temperature and includes a predetermined high concentration of the tin component with a sufficient amount of fluorine dopant.

The liquid coating composition of the invention also may include 1–10% of a polar organic compound, such as methylisobutyl ketone, acetic anhydride or ethyl acetate, which will insure that the composition remains stable in one liquid phase below room temperature, e.g. even at −15° C. Thereby the liquid composition may be conveniently stored outdoors or transported during winter weather without becoming hazy which would evidence phase separation.

Typically, the reaction product provides a fluorine-containing organotin precursor for coating in which one chlorine atom from the organotin reactant has been replaced by the reactive fluorine dopant compound. For example, the reaction product of monobutyltin trichloride and trifluoroacetic acid is monobutyldichlorotin trifluoroacetate.

The liquid coating composition of the invention may comprise the reaction product dissolved in a liquid organotin compound, preferably those compounds used to prepare the reaction product itself. Such additional organotin compound may be provided in situ during preparation of the reaction product, whereupon the resulting reaction product containing excess organotin compound is used directly as the liquid coating composition. Alternatively, the desired organotin compound may be added to the reaction product after formation thereof.

While fluorocarboxylic acids, anhydrides, etc. are used herein as the fluorine reactant in the process of forming the reaction product of the liquid coating composition of the invention, it will be understood that such reactants includes salts thereof, e.g. the sodium, potassium, and ammonium salts, and other useful derivatives of such compounds, which will improve the yield of the product.

The vaporization temperature in the chemical vapor deposition process usually ranges from about 100° to about 400° C., and preferably about 150° to 250° C. The substrate temperature ranges from above 400° to about 700° C., preferably about 550° to about 650° C.

The carrier gas is an oxygen-containing gas which may be air or a mixture of oxygen and an inert gas, and is preferably air.

The carrier air may be dry or wet in the process of the invention, and, accordingly, the relative humidity of the air at 18° C. may vary from 0–100%. Preferably the humidity ranges from 10–50%, where the rate of deposition is enhanced without introducing unnecessary haze into the coating.

The substrate to be coated may be glass, ceramics, solid state materials, metals, elemental filaments and the like.

The process conditions can be varied to provide a hard, resistant fluorine-doped tin oxide coating on many substrates with acceptable transmittance, reflectance and conductivity properties. For example, if the substrate to be coated is glass made by the flotation process, the sheet resistance of the coating at a thickness of about 160 to 250 nm preferably will be 40 ohm/sq. or less. Thicker films above 250 nm will have lower sheet resistances but the light transmittance of the glass will be reduced. Below 160 nm thickness the conductivity of the glass will be too low and the film will permit too great a heat loss from a room protected by such coated glass.

The sheet resistance (ohms/sq) of the tin oxide film is measured with a conventional four point probe according to ASTM standard method F374-81.

The film thickness is measured by the beta-back-scatter method according to British Standards Institution method BS5411: Part 12, 1981. ISO 3543-1981.

The infrared reflectivity is measured by a specular reflectance technique described by J. Stewart in "Infrared Spectroscopy", Marcel Dekker, Inc., N.Y. 1970 p. 539 ff.

The visible transmittance is measured on a UV/vis spectrophotometer over the 400–800 nm region, versus air and the % T$_{vis}$ is averaged over the wavelengths.

The bulk conductivity was determined from the sheet resistance and the film thickness according to the well known relationship.

$$\sigma = \frac{1}{R_\square \cdot t}$$

where
$\sigma$ equals conductivity in (ohm cm)$^{-1}$
$R_\square$ equals sheet resistance in ohms/sq.
t equals film thickness in centimeters.

Films prepared according to the preferred embodiments of the invention have infrared reflectivities greater than 70% at the conventional 10 micron wavelength of light which is characteristic of thermal infrared radiation at room temperature, visible transmittance of 80% or greater, sheet resistances preferably of less than 40 ohm/sq. and conductivities greater than 1250 (ohm cm)$^{-1}$ for films 1600–2500 nm thick. The films show a very light orange color in transmitted light, a light blue iridescence in reflected light, and are substantially haze-free.

The advantages of this invention can be more readily appreciated by reference to the following examples.

EXAMPLE 1

Preparation of the Reaction Product of Trifluoroacetic Acid and Monobutyltin Trichloride

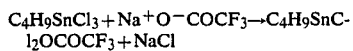

$C_4H_9SnCl_3 + Na^+O^-COCF_3 \rightarrow C_4H_9SnCl_2OCOCF_3 + NaCl$

A. A reaction mixture consisting of the sodium salt of trifluoroacetic acid (10 g., 4.8 wt. %) and monobutyltin trichloride (200 g., 95.2 wt. %) was reacted at 70° C. for 3 hrs. and allowed to stand overnight at room temperature. The reaction product mixture then was filtered to remove sodium chloride and unreacted sodium salt of trifluoroacetic acid. The resulting liquid coating composition was used as such for forming fluorine-doped tin oxide coatings by chemical vapor deposition. The composition consisted of 12 wt. % of the reaction product and 88 wt. % of monobutyltin trichloride.

B. The above example was repeated using the sodium salt of trifluoracetic acid (10 g., 16.7 wt. %) and monobutyltin trichloride (50 g. 83.3 wt. %) to form a liquid coating composition consisting of 28 wt. % of the reaction product and 72 wt. % of monobutyltin trichloride.

C. A reaction mixture of trifluoroacetic acid (3.42 g., 28.8 wt. %, 0.03 moles) and monobutyltin trichloride (8.46 g., 71.2 wt. %, 0.03 moles), KOH (2.08 g., 0.03 moles), 15 ml. H$_2$O, 50 ml. ether, 50 ml. methylethylketone and 0.1 g. of C$_{16}$H$_{33}$(CH$_3$)$_3$N$^+$B$^-$r (phase transfer catalyst) was prepared by dissolving the KOH in water and adding the trifluoroacetic acid; then separately charging the monobutyltin trichloride, ether and methylethylketone, and adding the phase transfer catalyst thereto; and thereafter mixing the charged solution to the salt of the trifluoroacetic acid. The reaction mixture was heated to reflux while stirring under a nitrogen blanket; refluxing was continued at 48° C. for 2 hours. After standing overnight, water and organic phases formed. The water phase was a clear, colorless lower layer, and the organic phase was a clear, yellow upper layer. The organic phase was concentrated and the residue was placed in a vacuum desiccator overnight. A brown, viscous liquid reaction product was obtained which was diluted with 98 g. of monobutyltin trichloride. The resulting liquid coating composition contained 10 wt. % of the reaction product and 90 wt. % of monobutyltin trichloride.

EXAMPLE 2

Tin Oxide Coatings on Glass

Glass substrates were coated by chemical vapor deposition using the liquid coating compositions prepared in Example 1. The fluorine-doped tin oxide coatings thus produced had excellent performance properties, including a sheet resistance of about 40 ohm/sq. at a film thickness of about 200 nm. The deposition time was 2 seconds. The infrared reflectivity of the tin oxide coatings was greater than 70% as measured at 10 microns. The visible light transmission of the coatings was 70% or greater.

While the invention has been defined with reference to certain preferred embodiments thereof, it will be understood that changes and modifications may be made which are within the skill of the art. It is intended to be bound by the appended claims.

What is claimed is:

1. A liquid coating composition for making high quality fluorine-doped tin oxide coatings having a low sheet resistance and high visible light transmission including the reaction product of a reactive organic fluorine dopant compound where at least one fluorine atom is located alpha or beta to a functional group wherein carbon is bonded to oxygen, selected from carboxylic acid, anhydride, ester, alcohol, or acid halide: and an organotin compound which is an alkyltin trichloride, a dialkyltin dichloride, an alkyldichlorotin acetate, or an ester tin trichloride: or tin tetrachloride.

2. A liquid coating composition according to claim 1 wherein said functional group is a carboxylic acid.

3. A liquid coating composition according to claim 1 wherein said functional group is an anhydride.

4. A liquid coating composition according to claim 1 wherein said functional group is an ester.

5. A liquid coating composition according to claim 1 wherein said functional group is an alcohol.

6. A liquid coating composition according to claim 1 wherein said functional group is an acid halide.

7. A liquid coating composition according to claim 1 wherein said organotin compound is an alkyltin trichloride.

8. A liquid coating composition according to claim 1 wherein said organotin compound is a dialkyltin dichloride.

9. A liquid coating composition according to claim 1 wherein said organotin compound is an alkyldichlorotin acetate.

10. A liquid coating composition according to claim 1 wherein said organotin compound is an ester tin trichloride.

11. A liquid coating composition according to claim 1 including the reaction product of:
(a) 1-30 wt. % of a reactive organic fluorine dopant compound which is trifluoroacetic acid, trifluoroacetic anhydride, ethyl trifluoroacetoacetate, trifluoroethanol, ethyl trifluoroacetate, or pentafluoropropionic acid, and
(b) 70-99 wt. % of an organotin compound which is an alkyltin trichloride, a dialkyltin dichloride, an alkyldichlorotin acetate, an ester tin trichloride; or tin tetrachloride.

12. A liquid coating composition according to claim 11 wherein said organotin compound is monobutyltin trichloride, methyltin trichloride, isobutyltin trichloride, dibutyltin dichloride, di-t-butyltin dichloride, butyldichlorotin acetate, or carbethoxyethyltin trichloride.

13. A liquid coating composition according to claim 11 in which said fluorine dopant is trifluoroacetic acid.

14. A liquid coating composition according to claim 11 in which said organotin compound is monobutyltin trichloride.

15. A liquid coating composition according to claim 11 in which said reaction product is formed from trifluoroacetic acid and monobutyltin trichloride.

16. A liquid coating composition according to claim 11 in which said composition also includes added organotin compound.

17. A liquid coating composition for making high quality fluorine-doped tin oxide coatings having a low sheet resistance and high visible light transmission including the reaction product of:
(a) 1-30 wt. % of a reactive organic fluorine dopant compound where at least one fluorine atom is located alpha or beta to a functional group wherein carbon is bonded to oxygen selected from carboxylic acid, anhydride, ester, alcohol, or acid halide; and
(b) 70-99 wt. % of tin tetrachloride.

18. A liquid coating composition according to claim 17 comprising the reaction product of:
(a) 1-30 wt. % of an organic fluorine dopant compound which is trifluoroacetic acid, trifluoroacetic anhydride, ethyl trifluoroacetoacetate, trifluoroethanol, ethyl trifluoroacetate or pentafluoropropionic acid; and
(b) 70-99 wt. % of tin tetrachloride.

19. A liquid coating composition according to claim 17 in which said composition also includes added tin tetrachloride.

20. A method of producing a high quality fluorine-doped tin oxide coating having a low sheet resistance and high visible light transmission comprising:
(a) forming a liquid coating composition of claim 1;
(b) vaporizing said liquid composition; and
(c) contacting said vapor in an oxygen-containing atmosphere with a substrate maintained at a temperature above the decomposition temperature of said vapor.

21. A method of producing a high quality fluorine-doped tin oxide coating wherein said composition is formed according to claim 11.

22. A method according to claim 21 where said substrate is glass.

* * * * *